US007885739B2

(12) United States Patent
Chinnadurai et al.

(10) Patent No.: US 7,885,739 B2

(45) Date of Patent: Feb. 8, 2011

(54) OPEN-ENDED VEHICLE DIAGNOSTIC DEVICE INTERFACE

(75) Inventors: Manokar Chinnadurai, Owatonna, MN (US); Matthew Jordison, Blooming Prairie, MN (US)

(73) Assignee: SPX Corporation, Charlotte, NC (US)

( * ) Notice: Subject to any disclaimer, the term of this patent is extended or adjusted under 35 U.S.C. 154(b) by 1420 days.

(21) Appl. No.: 10/921,187

(22) Filed: Aug. 19, 2004

(65) Prior Publication Data

US 2006/0041347 A1 Feb. 23, 2006

(51) Int. Cl.
*G06F 19/00* (2006.01)

(52) U.S. Cl. .............................. 701/35; 701/1; 701/29; 340/425.5; 340/438; 340/439

(58) Field of Classification Search .................. 701/35, 701/1, 29
See application file for complete search history.

(56) References Cited

U.S. PATENT DOCUMENTS

| | | | | |
|---|---|---|---|---|
| 2,640,968 | A | 6/1953 | Lehr | 339/66 |
| 4,392,661 | A * | 7/1983 | Langenstein | 280/28.17 |
| 4,924,039 | A * | 5/1990 | McAllise et al. | 191/12.2 R |
| D322,582 | S | 12/1991 | Friedman | D10/70 |
| 5,473,540 | A | 12/1995 | Schmitz | 364/424.05 |
| 5,491,418 | A * | 2/1996 | Alfaro et al. | 324/402 |
| 5,687,081 | A * | 11/1997 | Wellman et al. | 701/50 |
| 5,936,315 | A * | 8/1999 | Lais | 307/10.1 |
| 6,362,421 | B1 | 3/2002 | Layton, Jr. | 174/50 |
| 6,393,342 | B2 | 5/2002 | Bauer et al. | 701/1 |
| 6,405,112 | B1 | 6/2002 | Rayner | 701/35 |
| 6,438,472 | B1 * | 8/2002 | Tano et al. | 701/35 |
| 6,462,270 | B1 | 10/2002 | Depp et al. | 174/50 |
| 6,476,320 | B1 | 11/2002 | Ritter et al. | 174/66 |
| 6,515,226 | B2 | 2/2003 | Chiriku et al. | 174/50 |
| 6,539,358 | B1 | 3/2003 | Coon et al. | 704/275 |
| 6,586,674 | B2 | 7/2003 | Krause et al. | 174/50.5 |
| 6,633,482 | B2 | 10/2003 | Rode | 361/686 |
| 6,816,760 | B1 * | 11/2004 | Namaky | 701/29 |
| 6,848,916 | B2 | 2/2005 | Nakayama et al. | 439/76.2 |
| 6,881,899 | B1 | 4/2005 | Trangsrud | 174/50 |
| 6,916,985 | B1 | 7/2005 | Harwood | 174/38 |
| 6,939,155 | B2 | 9/2005 | Postrel | 439/297 |
| D519,859 | S | 5/2006 | Chinnadurai et al. | D10/46 |
| 7,079,927 | B1 | 7/2006 | Tano et al. | 701/35 |
| 7,117,984 | B2 * | 10/2006 | Jordison et al. | 191/12 R |
| 7,155,322 | B2 | 12/2006 | Nakahara et al. | 701/35 |
| 7,208,685 | B2 | 4/2007 | Browning et al. | 174/544 |
| 7,239,945 | B2 | 7/2007 | Hiemer et al. | 701/29 |
| 7,430,465 | B2 * | 9/2008 | Liebl et al. | 701/35 |
| 2001/0044677 | A1 * | 11/2001 | Bauer et al. | 701/1 |

(Continued)

*Primary Examiner*—Khoi Tran
*Assistant Examiner*—Jonathan L Sample
(74) *Attorney, Agent, or Firm*—Baker & Hostetler LLP

(57) ABSTRACT

An apparatus and method are provided that allow a user to increase the functionality of a vehicle data recorder. An option card can be connected to the option card connector on the vehicle data recorder. The option card includes at least one component thereon, such as a software, a processor, a FPGA, a memory, a power supply, a data port, a communication protocol controller, pins, a multiplexer, a hardware and a combination thereof. The components can allow the vehicle data recorder to communicate with new communication protocols that are developed, with current ones that may not have been included in the vehicle data recorder or additional functions required by the user.

33 Claims, 4 Drawing Sheets

U.S. PATENT DOCUMENTS

| | | | | |
|---|---|---|---|---|
| 2003/0182033 | A1* | 9/2003 | Underdahl et al. | 701/29 |
| 2004/0083041 | A1* | 4/2004 | Skeen et al. | 701/35 |
| 2004/0111189 | A1* | 6/2004 | Miyazawa et al. | 701/1 |
| 2004/0148073 | A1* | 7/2004 | Hawig et al. | 701/35 |
| 2005/0096809 | A1* | 5/2005 | Skeen et al. | 701/29 |
| 2005/0107929 | A1* | 5/2005 | Haydn | 701/35 |
| 2006/0106514 | A1 | 5/2006 | Liebl et al. | 701/35 |

* cited by examiner

OPEN-ENDED VEHICLE DIAGNOSTIC DEVICE INTERFACE

FIELD OF TH INVENTION

The present invention relates generally to an apparatus and method for diagnosing events in a vehicle. More particularly, the present invention relates to an option card that can interface with a diagnostic apparatus, such a Vehicle Data Recorder (VDR2), and increase its functionality.

BACKGROUND OF THE INVENTION

When a problem arises in a vehicle, such as an automobile, the owner takes the automobile to a service station or a garage for a mechanic to diagnose the problem. If the problem occurs frequently or occurs at the service station, then the mechanic can diagnose the problem with the diagnostic tools on site. However, the problem can be intermittent and may not occur when the vehicle is at the service station, thus the mechanic may not be able to diagnose the problem. If the mechanic cannot diagnose the problem while the vehicle is at the service station, the owner can become frustrated because the problem still exists and he has taken time off from work in order to bring the vehicle for service. Further, the owner will have to take additional time off to bring the vehicle back for servicing when the intermittent problem occurs again. This scenario can be repeated many times before the problem is properly diagnosed.

An intermittent problem or event may be a spark plug in one of the vehicle's cylinder that does not fire properly when the vehicle hits a bump in the road at certain speeds causing the vehicle to lose power. The event does not occur every time the vehicle hits a bump, but does occur enough that the owner is frustrated. Further, should the intermittent problem occur when the vehicle is in the middle of an intersection, the driver may cause an accident due to loss of power during acceleration across a crowded intersection. However, since the event may not be recreated at the service station or when the mechanic takes the vehicle for a test drive, it will be difficult for the mechanic to diagnose the problem.

A vehicle data recorder (VDR) has been available to record such events when they occur. The VDR is a self-contained modular unit that is easily connected to a vehicle. It will monitor and record diagnostic data from the vehicle's computer (Electronic Control Unit or ECU) so that when the event occurs, the data from the event can be recorded and later viewed by the user. Once the data from the event is recorded by the VDR, the mechanic can upload the data into a host workstation and diagnose the problem.

The VDR can be an expensive purchase for a mechanic, particularly if the mechanic owns a small garage. Should new communication protocols are incorporated into newer cars, the mechanic would be forced to purchase a new VDR with that capability in order to service it. Additionally, if new features are desired by the mechanic, he would have to purchase that VDR with those new features.

Accordingly, it is desirable to provide an apparatus and method that can interface with a VDR and update the VDR with new hardware and software without the user purchasing a new VDR.

SUMMARY OF THE INVENTION

The foregoing needs are met, to a great extent, by the present invention, wherein in one aspect an apparatus is provided that in some embodiments include a VDR that is capable of increased functionality.

In accordance with one embodiment of the present invention a vehicle data recorder is provided and can include a first connector that can communicate with a vehicle's computer, a processor that can control the vehicle data recorder functions, a memory that can store data from an event and can communicate with the processor, at least one communication protocol controller for controlling a communication protocol of the vehicle's computer, an option card connector that can releasably connect and communicate with an option card, wherein the option card can include a board having at least one component thereon to increase functionality of the vehicle data recorder, and a second connector that can communicate with a host workstation to transfer the data from the vehicle data recorder to the host workstation. At least one communication protocol controller may control CAN communication protocol. At least one component can be selected from a processor, a FPGA, a memory, a power supply, a data port, a communication protocol controller, pins, a multiplexer, a hardware and a combination thereof. The option card may allow for at least one of pin swapping, pin reconfiguration and additional pins for communication in new protocols. Additionally, at least one component may include software and the at least one communication protocol controller may control communication hardware selected from J1850, UART, ISO 9141, GMLAN, Vehicle SCI and other communication protocol hardware. The VDR can further include a cover to cover the option card connector. Further, the increase functionality may include communicating in additional communication protocol, increasing processing capability, increasing data communication capability with an external device, adding new hardware and software required for a new communication protocol, increasing memory capacity and a combination thereof.

In accordance with another embodiment of the present invention, a method of increasing functionality of a vehicle data recorder is provided and can include providing a vehicle data recorder with a card connector, connecting an option card to the card connector, and increasing the functionality of the vehicle data recorder by having at least one component on the option card to increase functionality. The vehicle data recorder can communicate via CAN communication protocol. Additionally, at least one component can be selected from a software, a processor, a FPGA, a memory, a power supply, a data port, a communication protocol controller, pins, a multiplexer, a hardware and a combination thereof. The increasing functionality can include communicating in additional communication protocol, increasing processing capability, increasing data communication capability with an external device, adding new hardware and software required for a new communication protocol, increasing memory capacity and a combination thereof.

In accordance with yet another embodiment of the present invention, a vehicle data recorder system is provided and may include first means for connecting that can connect to a vehicle's computer and relay data from a vehicle, means for processing that can control the vehicle data recorder functions, means for storing data that may store data and communicate with the means for processing, means for controlling communication protocol for controlling the communication protocol of the vehicle's computer, second means for connecting that can releasably connect and communicate with an option card means, wherein the option card means can include a board having at least one component thereon to increase functionality of the vehicle data recorder, and third connecting means for communicating with a computing means and for transferring the data from the vehicle data recorder to the computing means. The means for controlling communication protocol can control CAN communication. Further, at least one component is selected from a processor, a FPGA, a memory, a power supply, a data port, a communication protocol controller, pins, a multiplexer, a hardware and a combination thereof. The option card means may allow for at least one of pin swapping, pin reconfiguration and additional pins for communication in new protocols. Additionally, at least one component may include software and means for controlling communication protocol can controls communication hardware selected from J1850, UART, ISO 9141, GMLAN, Vehicle SCI and other communication protocol hardware. The vehicle data recorder system can further include a cover means to cover the option card connector. Additionally, the increase functionality may include communicating in additional communication protocol, increasing processing capability, increasing data communication capability with an external device, adding new hardware and software required for a new communication protocol, increasing memory capacity, increasing power and a combination thereof.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
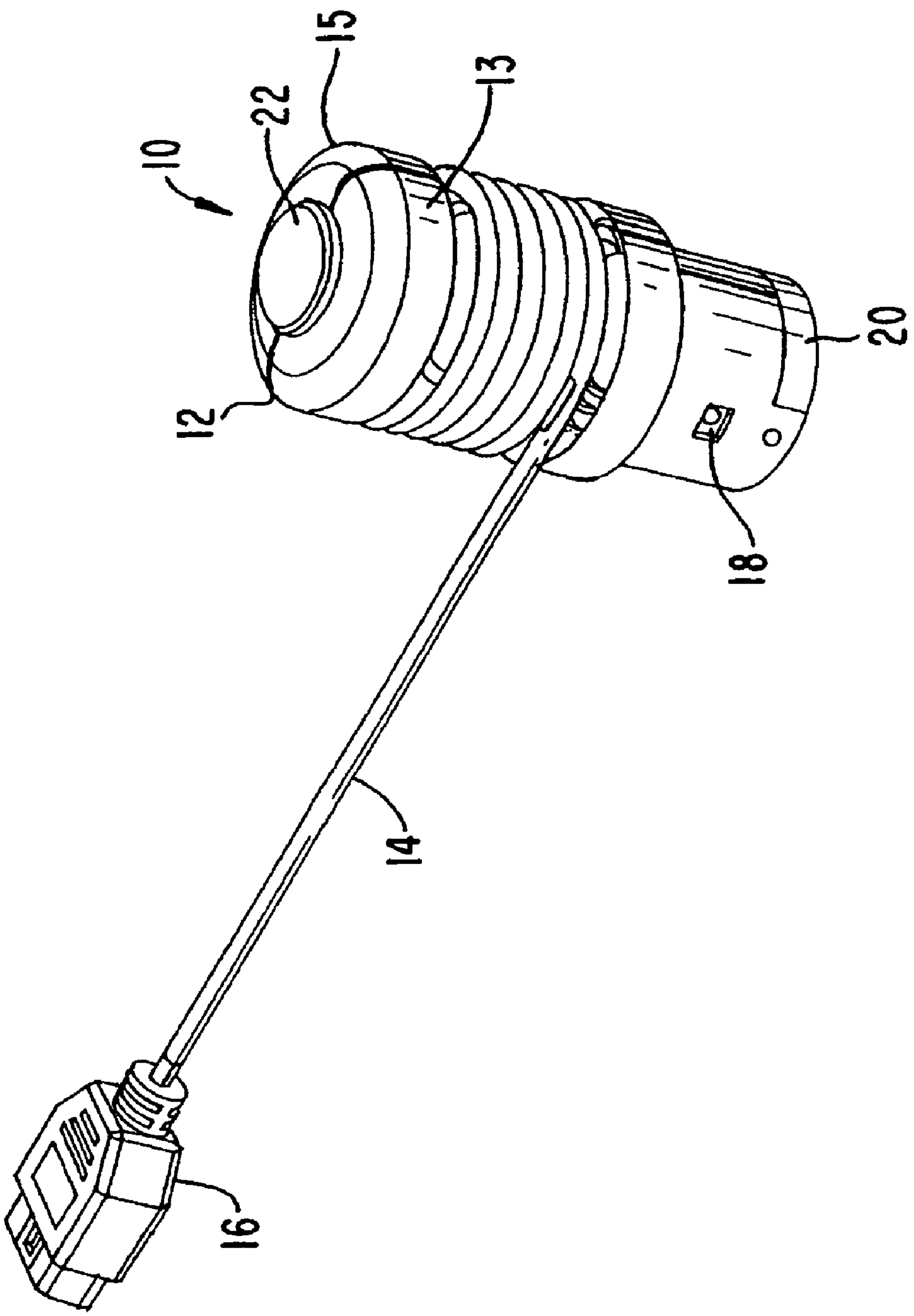
FIG. 1 is a perspective view of a VDR that can interface with the option card according to a preferred embodiment of the invention.

The invention will now be described with reference to the drawing figures, in which like reference numerals refer to like parts throughout. An embodiment in accordance with the present invention provides an option card that can interface with a VDR in order to provide the VDR with new hardware and software.

An embodiment of the present inventive apparatus and method is illustrated in FIG. 1, which is a perspective view of a VDR 10. VDR 10 includes a housing 12, an integrated vehicle I/O cable 14 with a J1962 male connector 16 to communicate with the vehicle's computer (ECU), a power connector 18, a communication port (not shown), a cover 20 that covers an optional card connector and a trigger button 22 with LED illumination.

The housing 12 covers the internal components (described below) and can include a first 13 and second parts 15 for easy assembly. The housing 12 can be any shape but is preferably cylindrical in shape. The trigger button 22 is located on the top portion of the VDR and can be any shape, but preferably is cylindrically shaped. The trigger button 22 when depressed will cause the VDR to record the vehicle data information so that the data related to the event can be captured. The trigger button 22 can be illuminated by LED so that it can be used in dark environmental conditions. The LED can remain steady so that the user can easily locate the VDR in the dark and can be flashing when the event data is being recorded. It will be recognized by a person skilled in the art that the trigger button 22 can be located anywhere on the outside surface of the VDR including the sides and the bottom.

The VDR can be programmed to record data for a period of time before and after the trigger button 22 is depressed, record data for a period of time without the user's intervention, record only when the trigger button is actuated and stops recording when the trigger button again actuated, record for any other time period desired by the user, and a combination thereof. The data can be uploaded later to the host workstation for the user to review the data from the event.

The cable 14 with the J1962 male connector 16 provide communication between the ECU and the VDR. The cable 14 can be any length so long as its length is long enough for the user to connect the VDR to the ECU. When not in use, the cable can be wrapped around the housing 12 for easy storage. The J1962 male connector 16 connects to its complementary female connector on the ECU. The J1962 male connector 16 allows the VDR to collect data from the ECU in various communication protocols, including CAN.

The power connector 18 is used when the VDR is not connected to the vehicle and the data contained therein is being uploaded to the host workstation. The host workstation can be any computing device, such as a computer, personal digital assistant (PDA) or a scan tool. The information from the VDR can be uploaded to the host workstation via the communication port, which can include a RJ-45 jack.

The cover 20 covers the optional card connector. The cover 20 is removably attached for easy access to the optional card connector. The optional card can update and add software, other information and hardware to the VDR and is further discussed below.

Figure 2:
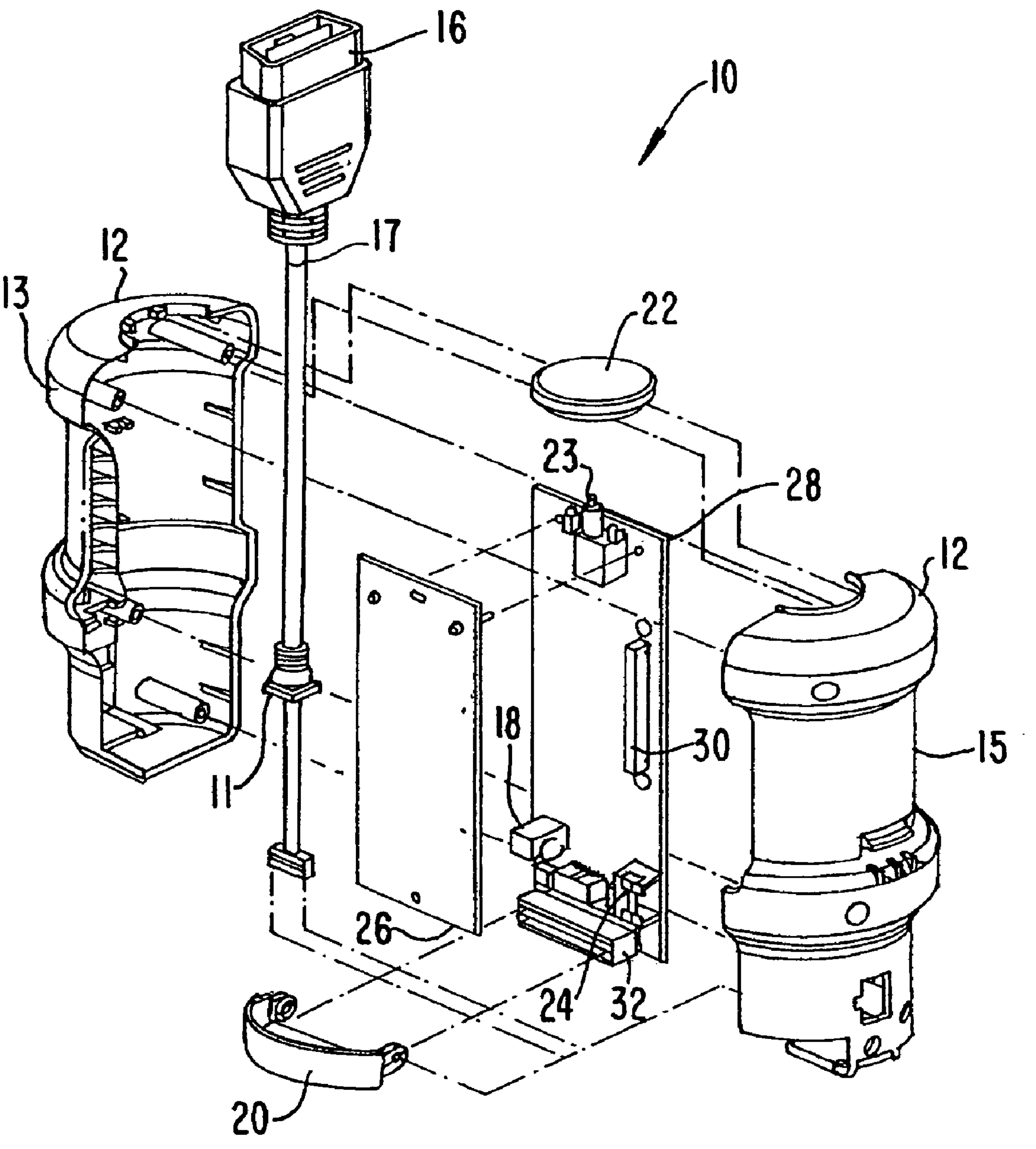
FIG. 2 is an exploded view of the VDR's external and internal components.

FIG. 2 is the exploded view of the VDR's 10 external and internal components. The internal components are contained in the housing 12, which includes the first 13 and second 15 parts. The first part 13 includes an opening for the power connector 18 to connect to an external power source. When the VDR is used in the vehicle, it can be powered by the battery of the vehicle via the J1962 male connector 16 and when the data from the VDR is being downloaded to the host workstation, the external power source is utilized or when needed by the user. The second part 15 includes an opening for the communication port 24 for data communication with the host workstation. The first 13 and second 15 parts have a top portion that receives the trigger button 22 and a bottom portion that receives the cover 20.

The cable 14 includes a first end 11 that is connected to a main board 28 and a second end 17 that is connected to the J1962 male connector 16. The J1962 male connector 16 connects to its complementary female connector on the vehicle's ECU. The J1962 male connector 16 includes various pins that can communicate with various communication protocols in the vehicle.

The main board 28 and a second board 26 are coupled together and communicate with each other via a high density board-to-board connector 30. The main board 28 and the second board 26 can also be coupled together by pins. The main board 28 includes a vehicle I/O, a real-time clock, the power connector 18, a trigger switch 23, and other interface connectors, such as the optional card connector 32, and the communication port 24. The optional card connector 32 connections with an option card (discussed below), which can be used to update the VDR with new communication protocols, pin assignments, software, hardware, configurations for a Field Programmable Gate Array (FPGA), discussed below and other features.

The trigger switch 23 is actuated by the user when he depresses the trigger button 22 and data from the vehicle is recorded. The second board 26 contains the processor, memory, and protocol controllers (discussed below). Although three cards (main and second boards and option card) are discussed herein, one skilled in the art will recognize that additional cards and components or less cards and components are possible depending on the needs of the user.

Figure 3:
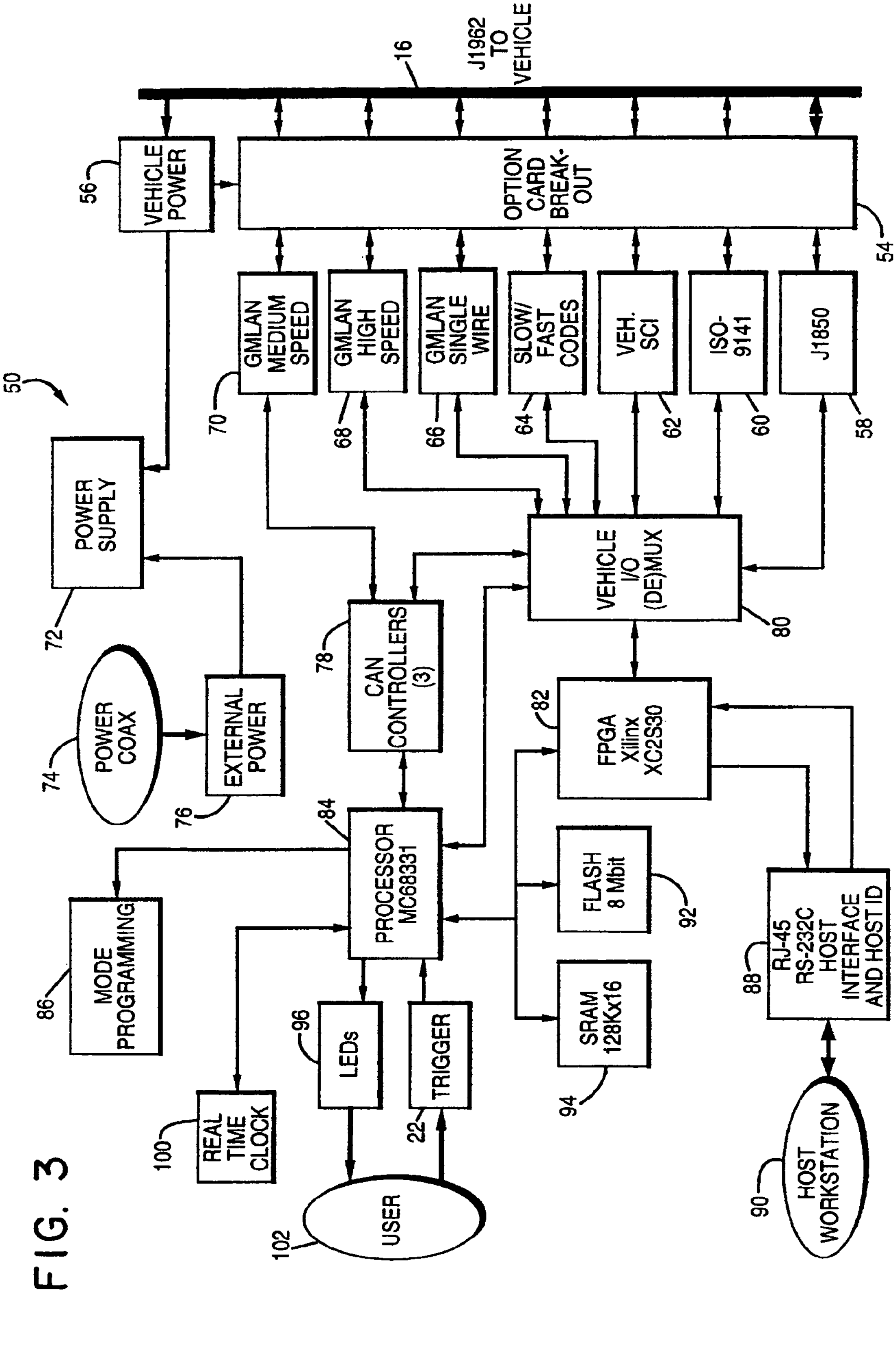
FIG. 3 is a functional block diagram of an embodiment of the VDR that includes the option card.

FIG. 3 is a functional block diagram 50 of an embodiment of the VDR. The J1962 male connector 16 can be connected to the ECU so that the VDR can collect diagnostic data from the vehicle. The J1962 male connector 16 includes various pins that mate with complementary pins in the ECU. The pins relay communication protocols that carry diagnostic data and instructions to and from the vehicle. The pins are assigned depending on the communication protocol of the vehicle and are known in the art.

The option card 54 provides flexibility to the VDR by allowing the VDR to support new communication protocols, pin assignments, software, information, hardware, and configure the FPGA. Additionally, the option card 54 can also act to simply pass through the communication protocols, if desired. All communication protocols hardware circuits 58, 60, 62, 64, 66, 68, 70 can communicate with the option card 54.

When the VDR is being used in the vehicle, it can be powered by the vehicle power 56 that supplies power to a power supply 72. The vehicle power 56 can be provided through the J1962 male connector 16 when it's hooked up to the vehicle's computer. Alternatively, power coax 74 can be used to supply external power 76 to the power supply 72 when the VDR is outside of the vehicle, such as when it is downloading event data to the host workstation or as otherwise needed by the user.

The communication protocols and hardware include J1850 (58), ISO 9141 (60), Vehicle SCI 62 (Serial Communication Interface), Slow/Fast Codes 64, GMLAN Single Wire 66, GMLAN high speed 68, and GMLAN medium speed 70. The J1850 (58) is a multiplexed communication protocol that can be further divided into Variable Pulse Width (VPW) and Pulse Width Modulation (PWM). PWM typical communication speed is about 41.6 kbps (kilobits per second) and is a two wire balanced signal, while VPW typical communication speed is about 10.4 kbps and is a one signal wire. This protocol is used for diagnostic and data sharing purposes and can be found in engine, transmission, ABS, and instrumentation applications.

ISO 9141 (60) is either a single wire (K line only) or a two wire (K and L line). The K line is bi-directional and conveys address information and data with the ECU. The L line is unidirectional and is only used during initialization with the ECU. This protocol is implemented on 1996 and newer vehicles.

GMLAN is a family of serial communication buses that allows ECUs to communicate with each other or with a diagnostic tester. There are three types of buses, a dual wire high speed bus (GMLAN high speed) 68, a dual wire medium speed bus (GMLAN medium speed) 70, and a single wire low speed bus (GMLAN single wire) 66. The GMLAN high speed 68 (500 kbps) is typically used for sharing real time data such as driver commanded torque, actual engine torque, steering angle, etc. The GMLAN medium speed 70 (up to 250 kbps) is typically used for applications (display, navigation, etc.) where the system's response time demands that a large amount of data be transmitted in a relatively short amount of time, such as updating a graphics display. The GMLAN single wire 66 (33.33 kbps) is typically used for operator controlled functions where the system's response time requirements are in the order of 100-200 msecs. This bus also supports high speed operation at 83.33 kbps used only during ECU reprogramming. The decision to use a particular bus in a given vehicle depends upon how the feature/functions are partitioned among the different ECUs in that vehicle. GMLAN buses use the CAN communications protocol for relaying information.

CAN is a serial bus system, which was originally developed for automotive applications and is suited for networking devices such as sensors, and actuators. Protocols of CAN include Dual-Wire high (nominal transmission rate of 500 kbps) and medium speed (nominal transmission rate of 95.24 kbps) and Single-Wire normal mode (nominal transmission rate at 33.33 kbps and high speed mode (nominal transmission rate at 83.33 kbps). CAN is used in applications, such as transmissions, power windows, lights, power steering and instrument panels. A CAN transmitter can send a packet or a message with an identifier to all CAN nodes in the vehicle and each node can determine, based on the identifier, whether it should process the packet. The identifier can also determine the priority the message receives while using the bus. If two messages are sent by two difference devices at the same time to the bus, the device with the lower priority identifier will yield to the higher priority identifier until the higher priority identifier message is completed. After the higher priority message is sent, then the lower priority message will have access to the bus. Thus, the message is not lost and is determinant. CAN advantages include a high degree of flexibility since CAN nodes can be added without change to software or hardware and all nodes can be simultaneously communicated with.

Slow/Fast Codes can be found in GM vehicles and is a serial communication protocol. Some examples include GM Dual Baud, GM10, GM30, Master, Normal, Unidirectional and others. The serial baud transmission rate can be about 160 kbps to about 9600 kbps for Fast Codes. Slow Codes are used by grounding a Slow Code diagnostic pin in the vehicle diagnostic connector of the ECU, which forces the vehicle to display error codes via the check engine light. The user counts the number of blinks of the check engine light to represent an error code and decipher the code with a code manual.

Vehicle SCI 62 allows communication of data in a one-wire serial method between the tool and the ECU. The transmission rate is about 62.5 kbps. GM vehicles through 1995 use the UART (Universal Asynchronous Receiver/Transmitter is responsible for performing the main task in serial communications with computers), which makes use of this Vehicle SCI 62.

Certain vehicle I/O pins support multiple protocols and signals and must be passed through a Vehicle I/O 80 for proper routing, which includes MUX/DEMUX. Because vehicle manufacturers can assign different communication protocol signals on the same pin, the Vehicle I/O 80 processes the signal and routes the signal to the proper communication protocol processors. The proper routing configurations can be controlled through a microprocessor 84 (see below). The Vehicle I/O 80 is capable of communicating in the various communication protocol.

CAN controller 78 controls the CAN communication protocols discussed above. There can be three separate CAN controllers 78 (High and Medium Speed and Single Wire) in the VDR. With three CAN controllers 78, the different CAN protocols can be better routed to proper CAN controller for faster information receiving and transmitting than with just one CAN controller 78. The CAN controller 78 communicates with the Vehicle I/O 80 and the processor 84. A person skilled in the art will recognize that there can be one, two or any amount of CAN controller 78 on the VDR, as desired.

The processor 84 can be any processor that has enough processing power that is required by the VDR. Preferably, the processor 84 is the MOTOROLA MC68331. The processor 84 has the ability to provide mode programming 86, which can program the ECU by connecting different load resistors to a mode pin. The trigger button 22 is in communication with the processor 84 so that the processor can control the data gathering for the VDR. The trigger button 22 can be illuminated by the LED 96 and actuated by user 102.

Additionally, the processor 84 communicates with a real time clock 100, which retains time and date information without the need of external power. The real time clock 100 is part of the main board 28. It would be recognized by a person skilled in the art that the real time clock 100 can be integrated with the processor 84 or separate from it. Memory such as Flash 92 (boot, program, record) and SRAM 94 are provided to the processor 84 so that information can be loaded into the processor or FPGA 82 or the information can be stored for later retrieval.

The processor 84 also communicates with the FPGA 82. Any FPGA can be used, such as a XILINX XC2S30. The FPGA 82 is a specially made digital semiconductor that can be used as a programmable logic device that can emulate new electrical circuits as needed by the user. By incorporating the FPGA 82, the VDR can be updated with new circuits without the need of providing the actual new circuits on the boards or replacing the current boards on the VDR. The FPGA 82 versatility can be used to provide new circuits for new communication protocols or other needs.

The FPGA 82 is also in communication with RJ-45 (88) with RS-232C, which provides serial communication with the host workstation 90. The host workstation 90 receives the information uploaded by the VDR so that events can be analyzed.

Figure 4:
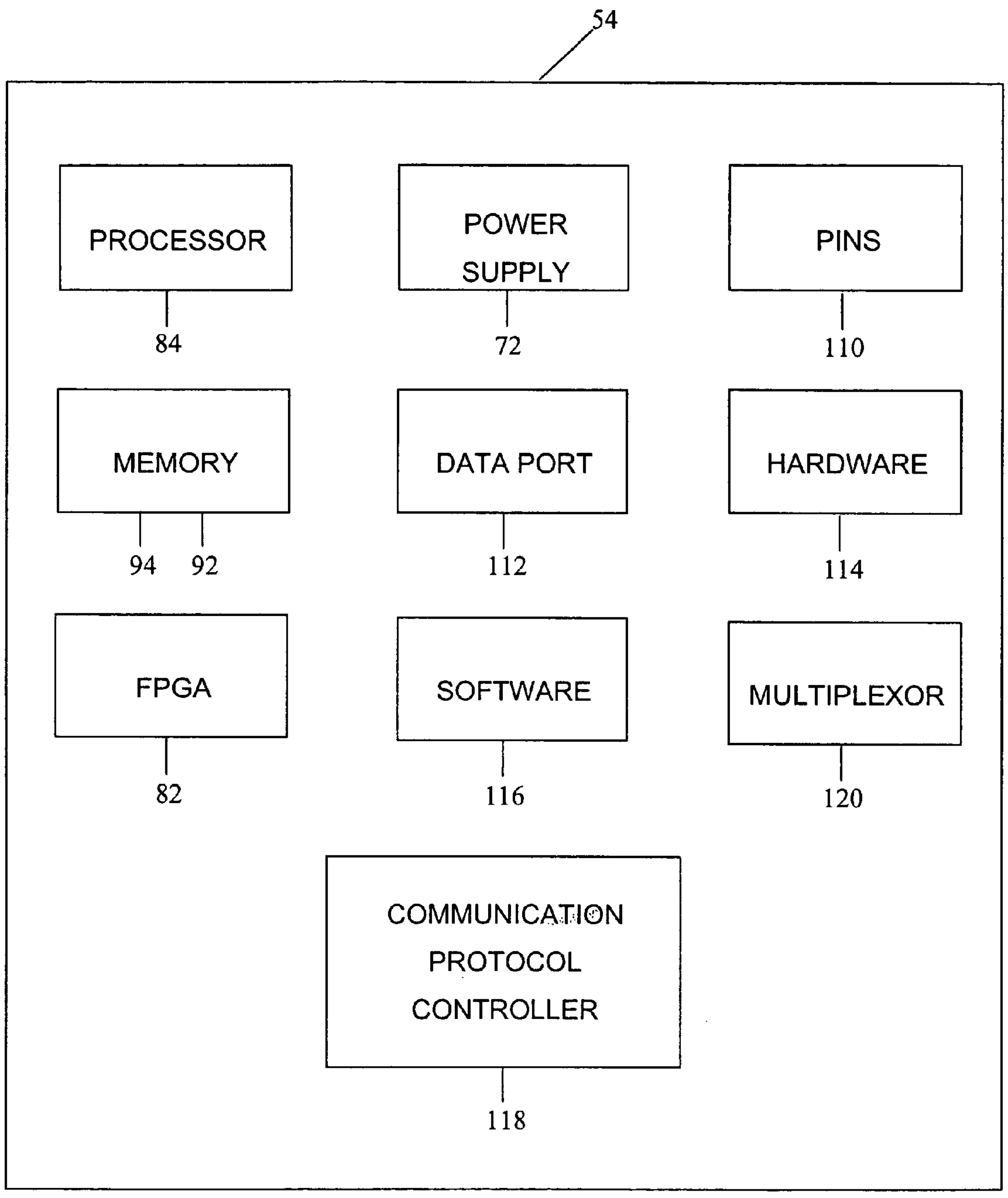
FIG. 4 is a diagram of examples of components on the option card.

FIG. 4 is a diagram of examples of components on the option card 54. The option card allows flexibility for pin swapping, pin reconfiguration or additional pins 110 to adapt to various current and new communication protocols. A multiplexer 120 can be added to provide additional circuits for signal communication. The multiplexer allows two or more devices to share a common transmission medium.

The VDR and the option card 54 can be supplied with power via vehicle power 56 and this allows the option card 54 to have active components thereon. Active components include new protocol transceivers 118 to communicate in the new communication protocols. Additional processor 84, FPGA 82, memories 92, 94, can be added to the VDR via the option card 54 to increase processing power and memory storage. Should additional power is needed for the VDR and its components, additional power supply 72 and conditioners can also be added with the option card 54.

Data transfer ports 112 can be added to the VDR so that the VDR can communicate with the host workstation or another external device. Wired data transfer ports (serial, parallel, USB (Universal Serial Bus), Fire Wire (IEEE 1394) and others) and wireless data transfer ports for wireless communication (Wi-Fi, BLUE TOOTH, Infrared, Radio Frequency and other wireless communication protocols) can be added to the VDR via the option card 54. The option card 54 can include the appropriate wireless communication transmitters and receivers thereon so that wireless communication can occur.

Software 116 updates can be added to the memory 92, 94, the processor 84 and FPGA 82 such as new firmware, software to communicate with new communication protocols, software to run new hardware, software to reconfigure the FPGA, software to update mode programming or new procedures. It will be recognized by a person skilled in the art that additional hardware 114 and software 116 can be added in the future without departing from the scope of the option card 54.

In operation, the desired components/hardware and software are added to the option card 54. The option card 54 is inserted into the option card connector 32 and can be protected by the cover 30. To replace the old option card 54 with a new option card, the cover 30 and the old option card can be removed and a new one inserted. Once completed, the cover 30 can be left off or reattached to the VDR depending on the size of the option card. By having an option card that interface with the VDR, the user can upgrade the VDR with new hardware and software without having to purchase a new VDR. As new features or communication protocols are introduced, the option card can be used to provide these new features and communication protocol hardware and software. The expense of purchasing the option card will be considerable less than purchasing a new VDR. Additionally, the easy to use interface that connects to an option card connector in the VDR allows the user to install the option card thereby saving money.

Although the components above are described to add functions to the VDR that may not have been available at the time the VDR was manufactured, the option card could also be used to add components that may have inadvertently left out of the original design for various reasons. For example, if a communication protocol existed, but the designers felt that it was not a standard protocol and thus, did not include the hardware and software to communicate in that protocol. The option card can be used to provide the necessary hardware and software to communicate in that protocol. Additionally, if the design engineer did not anticipate the need of additional memory, the option card can provide that additional memory.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A vehicle data recorder, comprising:

a first connector that releasably connects and communicates with a vehicle's computer;

a processor that controls the vehicle data recorder functions;

a memory that stores data from an event and communicates with the processor;

at least one communication protocol controller for controlling a communication protocol of the vehicle's computer;

an option card connector that releasably connects and communicates with an option card, wherein the option card comprises a board having at least one component thereon to increase functionality of the vehicle data recorder;

a second connector that communicates with a host workstation to transfer the data from the vehicle data recorder to the host workstation; and a housing having a first portion and a second portion each with a periphery greater than a periphery of a third portion disposed in between the first portion and the second portion composing a channel, wherein the channel accommodates a cable connected to the first connector when the cable is wrapped around the housing.

2. The vehicle data recorder of claim 1, wherein at least one communication protocol controller controls CAN communication protocol.

3. The vehicle data recorder of claim 1, wherein the at least one component is selected from a group consisting of a processor, a FPGA, a memory, a power supply, a data port, a communication protocol controller, pins, a multiplexer, a hardware and a combination thereof.

4. The vehicle data recorder of claim 1, wherein the option card allows for at least one of pin swapping, pin reconfiguration and additional pins for communication in new protocols.

5. The vehicle data recorder of claim 1, wherein the at least one component includes software.

6. The vehicle data recorder of claim 1, wherein the at least one communication protocol controller controls communication hardware selected from a group consisting of J1850, UART, ISO 9141, GMLAN, Vehicle SCI and other communication protocol hardware.

7. The vehicle data recorder of claim 1 further comprising a cover to cover the option card connector.

8. The vehicle data recorder of claim 1, wherein the increase functionality includes communicating in additional communication protocol.

9. The vehicle data recorder of claim 1, wherein the increase functionality includes increasing processing capability.

10. The vehicle data recorder of claim 1, wherein the increase functionality includes increasing data communication capability with an external device.

11. The vehicle data recorder of claim 1, wherein the increase functionally includes adding new hardware and software required for a new communication protocol.

12. The vehicle data recorder of claim 1, wherein the increase functionality includes increasing memory capacity.

13. A method of increasing functionality of a vehicle data recorder, comprising:

providing a portable vehicle data recorder with a card connector, the vehicle data recorder surrounding a housing having a first portion and a second portion each with a periphery greater than a periphery of a third portion disposed in between the first portion and the second portion composing a channel, wherein the channel accommodates a cable connected to the first connector when the cable is wrapped around the housing;

connecting an option card to the card connector;

increasing the functionality of the vehicle data recorder by having at least one component on a board on the option card; and actuating a button to control the recording functions of the vehicle data recorder.

14. The method of claim 13, wherein the vehicle data recorder can communicate via CAN communication protocol.

15. The method of claim 13, wherein the at least one component is selected from a group consisting of a software, a processor, a FPGA, a memory, a power supply, a data port, a communication protocol controller, pins, a multiplexer, a hardware and a combination thereof.

16. The method of claim 13, wherein increasing functionality include communicating in additional communication protocol.

17. The method of claim 13, wherein increasing functionality include increasing processing capability.

18. The method of claim 13, wherein increasing functionality includes increasing data communication capability with an external device.

19. The method of claim 13, wherein increasing functionality includes adding new hardware and software required for a new communication protocol.

20. The method of claim 13, wherein increasing functionality includes increasing memory capacity.

21. A vehicle data recorder system, comprising:

first means for connecting configured to releasably connect to a vehicle's computer and relays data from a vehicle;

means for processing configured to control the vehicle data recorder functions;

means for storing data configured to store event data and communicates with the means for processing;

means for controlling communication protocol for controlling the communication protocol of the vehicle's computer;

second means for connecting configured to releasably connect and communicate with an option card means, wherein the option card means comprises a board having at least one component thereon to increase functionality of the vehicle data recorder;

third connecting means configured to communicate with a host workstation and for transferring the data from the vehicle data recorder to the host workstation; and means for enclosing internal components and accommodating a cable connected to the first means for connecting when wrapped around the means for enclosing.

22. The vehicle data recorder system of claim 21, wherein the means for controlling communication protocol controls CAN communication.

23. The vehicle data recorder system of claim 21, wherein the at least one component is selected from a group consisting of a processor, a FPGA, a memory, a power supply, a data port, a communication protocol controller, pins, a multiplexer, a hardware and a combination thereof.

24. The vehicle data recorder system of claim 21, wherein the option card means allows for at least one of pin swapping, pin reconfiguration and additional pins for communication in new protocols.

25. The vehicle data recorder system of claim 21, wherein the at least one component includes software.

26. The vehicle data recorder system of claim 21, wherein means for controlling communication protocol controls communication hardware selected from a group consisting of J1850, UART, ISO 9141, GMLAN, Vehicle SCI and other communication protocol hardware.

27. The vehicle data recorder system of claim 21 further comprising a cover means to cover the second means for connecting.

28. The vehicle data recorder system of claim 21 wherein the increase functionality includes communicating in an additional communication protocol.

29. The vehicle data recorder system of claim 21, wherein the increase functionality includes increasing processing capability.

30. The vehicle data recorder system of claim 21, wherein the increase functionality includes increasing data communication capability with an external device.

31. The vehicle data recorder system of claim 21, wherein the increase functionality includes adding new hardware and software required for a new communication protocol.

32. The vehicle data recorder system of claim 21, wherein the increase functionality includes increasing memory capacity.

33. The vehicle data recorder system of claim 21, wherein the increase functionality include increasing power.

* * * * *